US006990507B2

(12) United States Patent
Shackleford et al.

(10) Patent No.: US 6,990,507 B2
(45) Date of Patent: Jan. 24, 2006

(54) PARITY PREDICTION FOR ARITHMETIC INCREMENT FUNCTION

(75) Inventors: J. Barry Shackleford, Portola Valley, CA (US); Motoo Tanaka, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 575 days.

(21) Appl. No.: 10/151,038

(22) Filed: May 21, 2002

(65) Prior Publication Data

US 2003/0220955 A1 Nov. 27, 2003

(51) Int. Cl.
*G06F 11/10* (2006.01)

(52) U.S. Cl. ....................................... 708/531; 708/672

(58) Field of Classification Search ................ 708/531, 708/672; 714/800, 801, 802, 803, 804
See application file for complete search history.

(56) References Cited

U.S. PATENT DOCUMENTS

| | | | | |
|---|---|---|---|---|
| 3,555,255 A * | 1/1971 | Toy | ............................ | 714/801 |
| 3,699,322 A * | 10/1972 | Dorr | .......................... | 714/800 |
| 3,732,407 A * | 5/1973 | Brewster et al. | ............ | 714/803 |
| 4,879,675 A * | 11/1989 | Brodnax | ..................... | 708/531 |

* cited by examiner

*Primary Examiner*—Chuong D. Ngo

(57) ABSTRACT

The present invention provides a method and apparatus to check the arithmetic increment function through prediction of the change in the bit-level parity of the result by means of a series of identical cells connected in a linear array. The array predicts the change in parity produced by the arithmetic increment function which allows the increment function to be checked in an efficient manner. The advantages of the present invention are that the parity check design saves hardware cost over prior schemes that require duplication of incrementers and comparison of the results and schemes that require generation of parity after incrementing, and that the iterative, identical cell implementation of the parity predictor is well-suited for current VLSI and future digital logic circuits as they progress towards molecular, self-assembling components.

13 Claims, 5 Drawing Sheets

PARITY PREDICTION FOR ARITHMETIC INCREMENT FUNCTION

TECHNICAL FIELD

The technical field generally relates to a method and apparatus for error-checking of an arithmetic increment function.

BACKGROUND

As digital logic devices become smaller they become more sensitive to the effects of electronic noise, such as electronic thermionic noise. The extremely high clock frequency of these devices, together with the high speeds of conventional microprocessors, create a system environment that is increasingly noisy. Thus, data in these high speed systems becomes more vulnerable to errors caused by transient electrical and electromagnetic phenomena.

In digital logic circuits, the effects of electronic noise are often manifested as random single errors. To detect these random errors, a checking circuit is required. One approach is to duplicate the hardware and compare the two results, which, of course, is expensive in duplicated circuitry and space on the integrated circuit.

Another approach is to use error detection and error correction techniques. Parity checking is a commonly-used technique for error detection where a parity bit, or check bit, is added to a group of data bits. The check bit may be asserted depending on the number of asserted data bits within the group of data bits. If even parity is used, the parity bit will make the total number of asserted bits, including the data bits and the check bit, equal to an even number. If odd parity if used, the parity bit will make the total number of asserted bits, including the data bits and the check bit, an odd number. As shown in FIG. 1, parity checking in this case is accomplished by generating 130 a parity bit, i.e., adding the number of data bits having a value of "1" in the data 125 calculated and then adding the parity bit or bits required to get the desired odd or even total for the transmitted data unit. The checking device 150 receives the data 145 and calculates the parity bit or bits required to give the desired odd or even total for the received data unit. If the parity bit or bits calculated 155 by the checking device 150 matches the parity bit or bits of the data 145, then the data is good. If the calculated parity bit or bits 155 does not match the parity bit or bits of the data, then there is a parity error in the received data. From the above it should be understood that parity checking is only effective for detecting an odd number of errors. If an even number of errors occurs, however, parity checking will not detect the error.

Another method of parity checking uses odd or even parity as well. In parity prediction, as shown in FIG. 2, the parity bit is predicted 230 at the same time that the data is calculated 220. A special parity prediction circuit 230 is used. The calculated data 245 is then checked 250 for a correct parity bit. As in FIG. 1, if the calculated parity 255 matches the parity of the data 245, then the calculated data is good. If the calculated parity bit 255 does not match the parity bit of the data 245, then the calculated data 245 has at least one error. As in FIG. 1, it should be understood that, due to the nature of its error checking process, simple parity error checking has a 50% probability of detecting data errors.

It is readily known that a single parity bit in conjunction with a multiple bit data word is useful for detecting an odd number of bit errors within the data word. Therefore, there is a need for a fast parity generating circuit that can be implemented cheaply on a digital logic circuit.

SUMMARY

The present invention provides a method and apparatus to check the arithmetic increment function through prediction of the change in the bit-level parity of the result by means of a series of identical cells connected in a linear array. The array predicts the change in parity produced by the arithmetic increment function which allows the increment function to be checked in an efficient manner. The advantages of the present invention are that the parity check design saves hardware cost over prior schemes that require duplication of incrementers and comparison of the results and schemes that generate a parity after incrementing, and that the iterative, identical cell implementation of the parity predictor is well-suited for current VLSI and future digital logic circuits as they progress towards molecular, self-assembling components.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
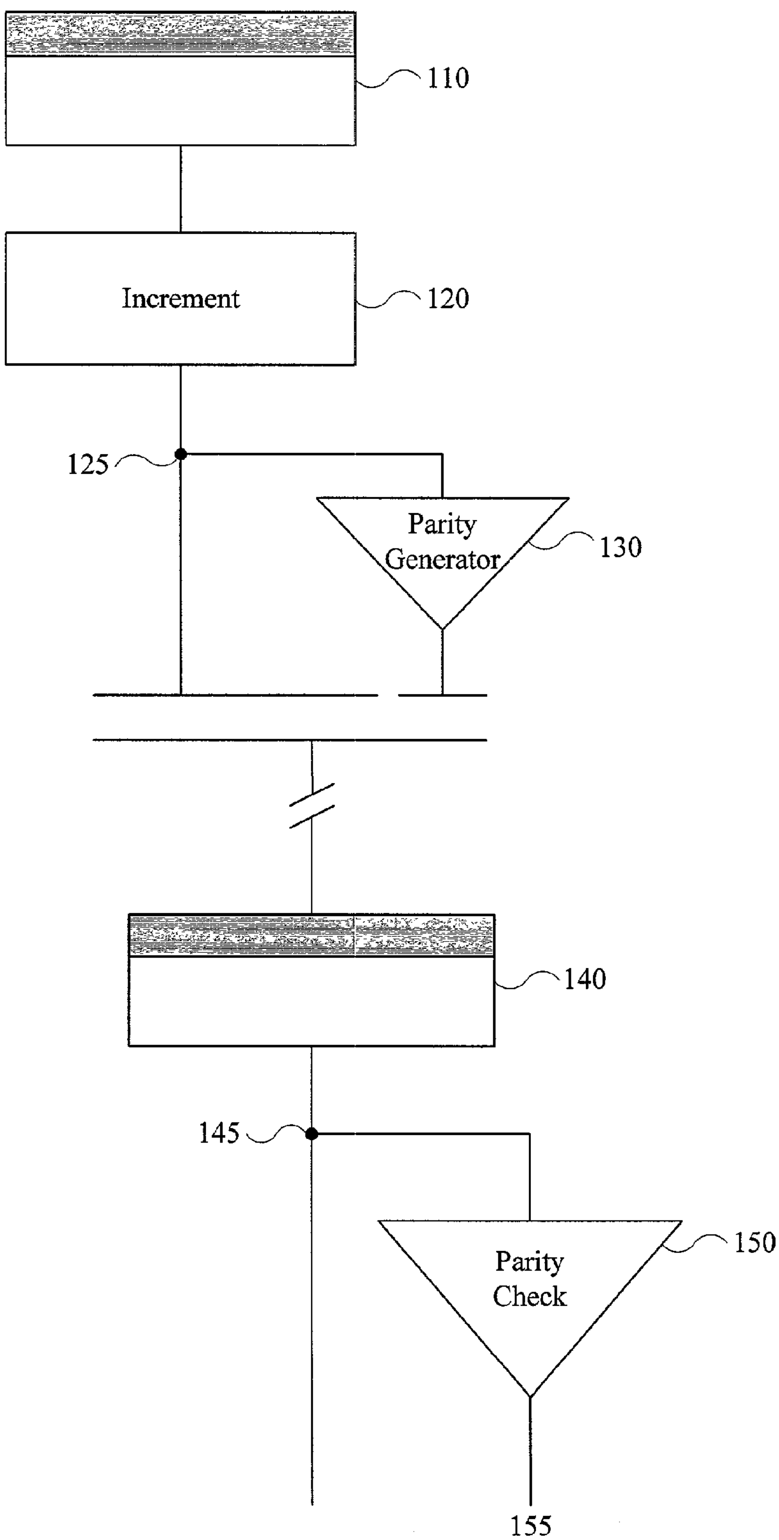
FIG. 1 illustrates a conceptual parity generating circuit.
Figure 2:
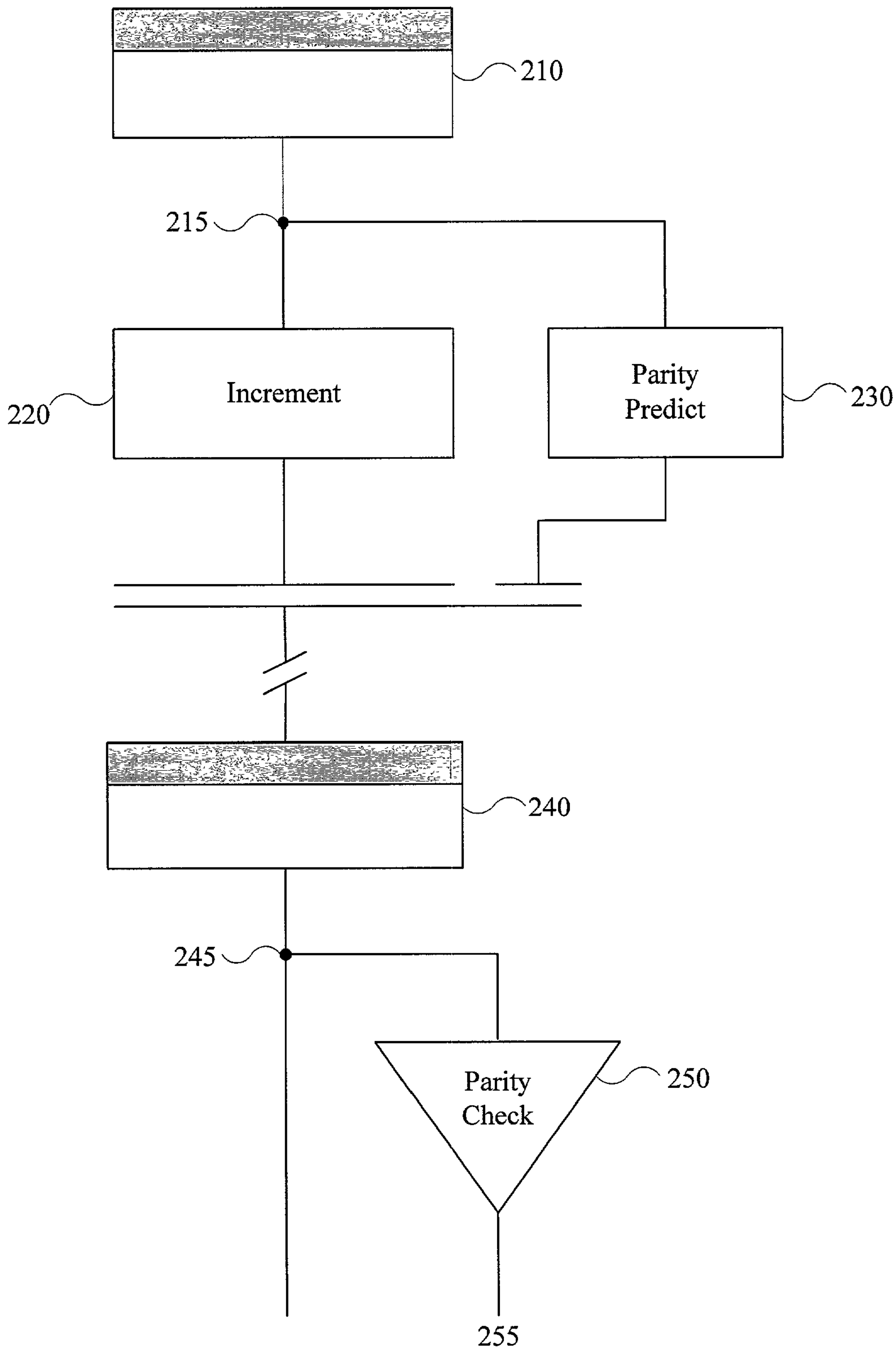
FIG. 2 illustrates a conceptual parity prediction circuit.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

Incrementers are used frequently in computer programs, especially in looping functions. The effect of incrementing a binary number on an operand is to invert all of the bits between the least significant bit and the first logical-zero bit inclusive, scanning from the right, i.e., the least significant bit, towards the left of the operand. In operations involving parity, changing, i.e., inverting, an even number of bits in an operand has no effect on the parity of the operand. Changing an odd number of bits inverts the parity of the operand.

One method of determining parity is to count the number of ones (or Zeros) in a binary number before and after the number has been incremented. For example, the number 1101111 incremented is 1110000, which has three fewer ones than the original operand. With an initial parity of 1, inverting the parity three times, i.e., for each change in the number of ones, yields an inverted parity of 0. For the number 0110111 incremented to 0111000, there are two fewer ones. With an initial parity of 1, inverting the parity two times for the number of ones changed yields an unchanged parity of 1.

Therefore, considering the operand to be incremented, if the position of the first logical zero from the least significant bit is displaced by an even number of bit positions, the result will have an inverse parity of the source operand. Otherwise, if the first zero is in an odd bit position, the parity of the result will be the same as the source operand. In counting the bit position of the first logical zero, the rightmost or least significant bit is counted as zero, which is included as an even number.

Table I illustrates the conditions when the parity of the operand should be inverted for the result. It should be apparent that only the first zero from the right, i.e., the least significant zero bit, is important, and that the numbers to the left of the first zero have no effect on the result parity. The numbers may be zero or one and are unchanged by the increment function.

TABLE I

Operand and the change in parity

| Operand | Result | Number of Bits Changed | Result Parity With Respect To Operand Parity |
|---|---|---|---|
| XXXXX0 | XXXXX1 | 1, odd | invert |
| XXXX01 | XXXX10 | 2, even | no change |
| XXX011 | XXX100 | 3, odd | invert |
| XX0111 | XX1000 | 4, even | no change |
| X01111 | X10000 | 5, odd | invert |
| 011111 | 100000 | 6, even | no change |

Figure 3:
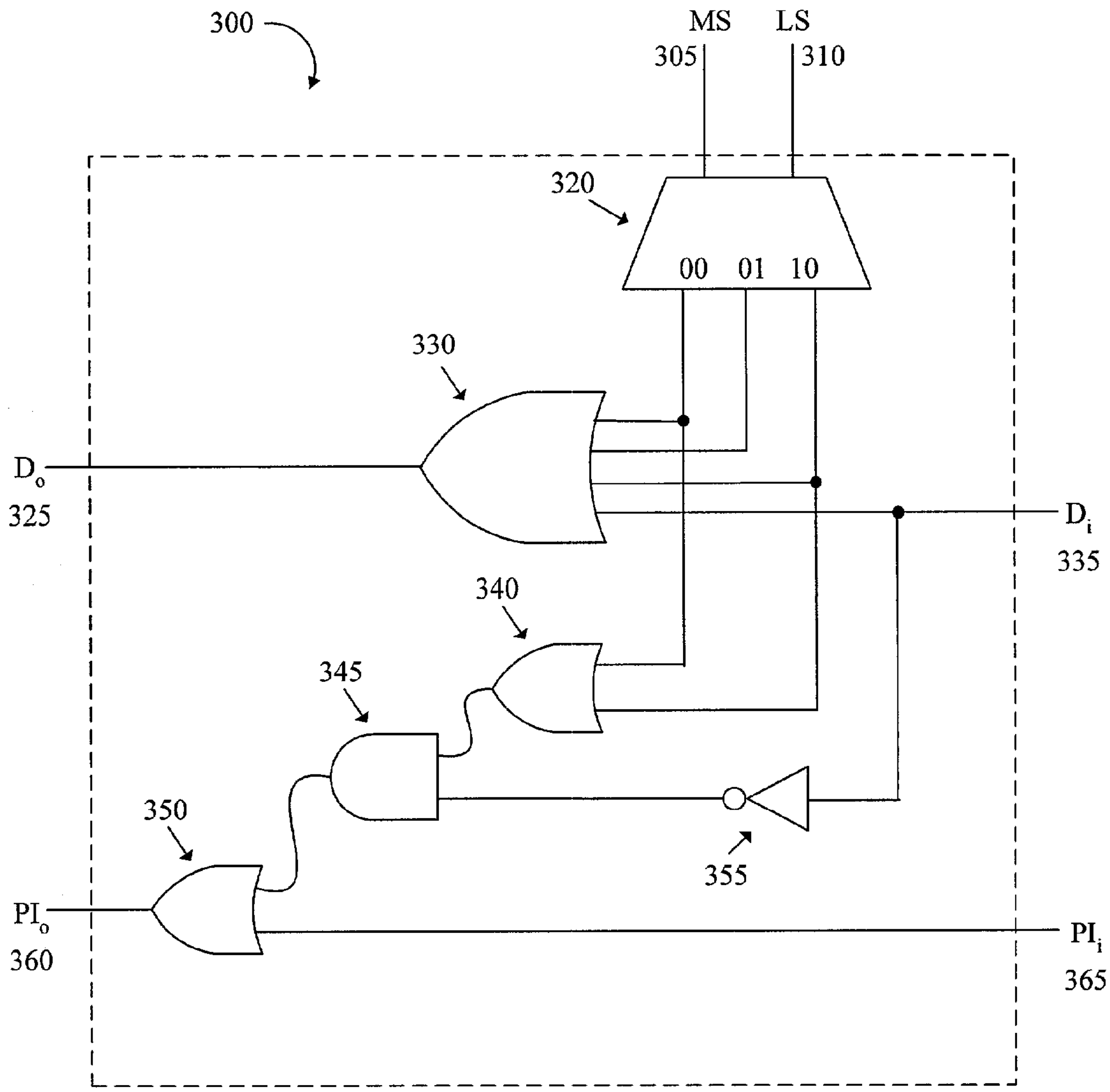
FIG. 3 illustrates a conceptual logic diagram of a circuit according to the present invention.

With reference now to FIG. 3, there is illustrated therein a logical diagram of a circuit according to the present invention, which is generally designated by the reference numeral 300. It should be recognized that Boolean optimizations can be performed on the circuit shown that would make it less expensive to build but more difficult to describe. It should nonetheless be understood that such optimized circuitry practicing the principles of the present invention would be within the scope of the present disclosure.

The function of the circuit or cell 300 is to determine if the two operand bits entering, i.e., the most significant operand bit 305 and the least significant operand bit 310, contain the first logical zero to the left of the least significant bit. If a logical zero is detected, then all cells to the left of the detecting cell must be disabled. A disable signal ($D_o$) or DisableOut 325 is sent to the next left cell and it is generated by a logical OR 330 of the next-right cell's disable signal ($D_i$) or DisableIn 335 along with the detection 320 of a logical zero in either of the two operand bits 305, 310.

Assuming a non-disabled cell, if the least significant operand bit 310 is a zero, and the most significant operand bit 305 is a one or zero, then the first zero from the least significant bit position is in an even bit position, when the least significant bit position is numbered zero, and thus the increment operation will change an odd number of bits, requiring that the parity of the result be inverted from the parity of the operand. This condition, ParityInvertOut ($PI_o$) 360, can be passed through an OR-gate 350 to the next-left cell, after being ANDed 345 with the condition that all cells to the right are not disabled 335, and eventually to the left end of the array of cells where it will be used to control the polarity of the parity for the result. The other input of the OR-gate 350 is the ParityInvertIn ($PI_i$)signal 365 from the cell to the right.

Again, assuming a non-disabled cell, if the most significant operand bit 305 is a zero, and the least significant operand bit 310 is a one, then the first zero from the least significant bit position is in an odd position, and thus an even number of operand bits will be changed by the increment operation and the parities of the operand and the result will be the same. No action is performed other than to convey the disable signal 325, disabling all of the cells to the left of the current cell 300. This is done by logically ORing 330 the condition that a zero was detected 320 in the most significant operand bit 305 with the other disable conditions 320, 335. No action is performed on the ParityInvertOut signal 360, which will be subsequently zero due to the zero received at the OR-gate 340 and received at the AND-gate 345.

In a disabled cell, the first logical zero from the least significant bit position has already been identified, and no action is performed. The DisableIn signal 335 is passed identically as the DisableOut signal 325, and the ParityInvertIn signal 365 is passed identically as the ParityInvertOut signal 360.

Table II shows a truth table of the cell. In the truth table, the most significant operand bit 305 is designated MS and the least significant operand bit 310 is designated by LS.

TABLE II

Truth Table

| MS | LS | $D_i$ | $PI_i$ | $D_o$ | $PI_o$ |
|---|---|---|---|---|---|
| 0 | 0 | 0 | 0 | 1 | 1 |
| 0 | 0 | 0 | 1 | 1 | 1 |
| 0 | 0 | 1 | 0 | 1 | 0 |
| 0 | 0 | 1 | 1 | 1 | 1 |
| 0 | 1 | 0 | 0 | 1 | 0 |
| 0 | 1 | 0 | 1 | 1 | 1 |
| 0 | 1 | 1 | 0 | 1 | 0 |
| 0 | 1 | 1 | 1 | 1 | 1 |
| 1 | 0 | 0 | 0 | 1 | 1 |
| 1 | 0 | 0 | 1 | 1 | 1 |
| 1 | 0 | 1 | 0 | 1 | 0 |
| 1 | 0 | 1 | 1 | 1 | 1 |
| 1 | 1 | 0 | 0 | 0 | 0 |
| 1 | 1 | 0 | 1 | 0 | 1 |
| 1 | 1 | 1 | 0 | 1 | 0 |
| 1 | 1 | 1 | 1 | 1 | 1 |

Figure 4:
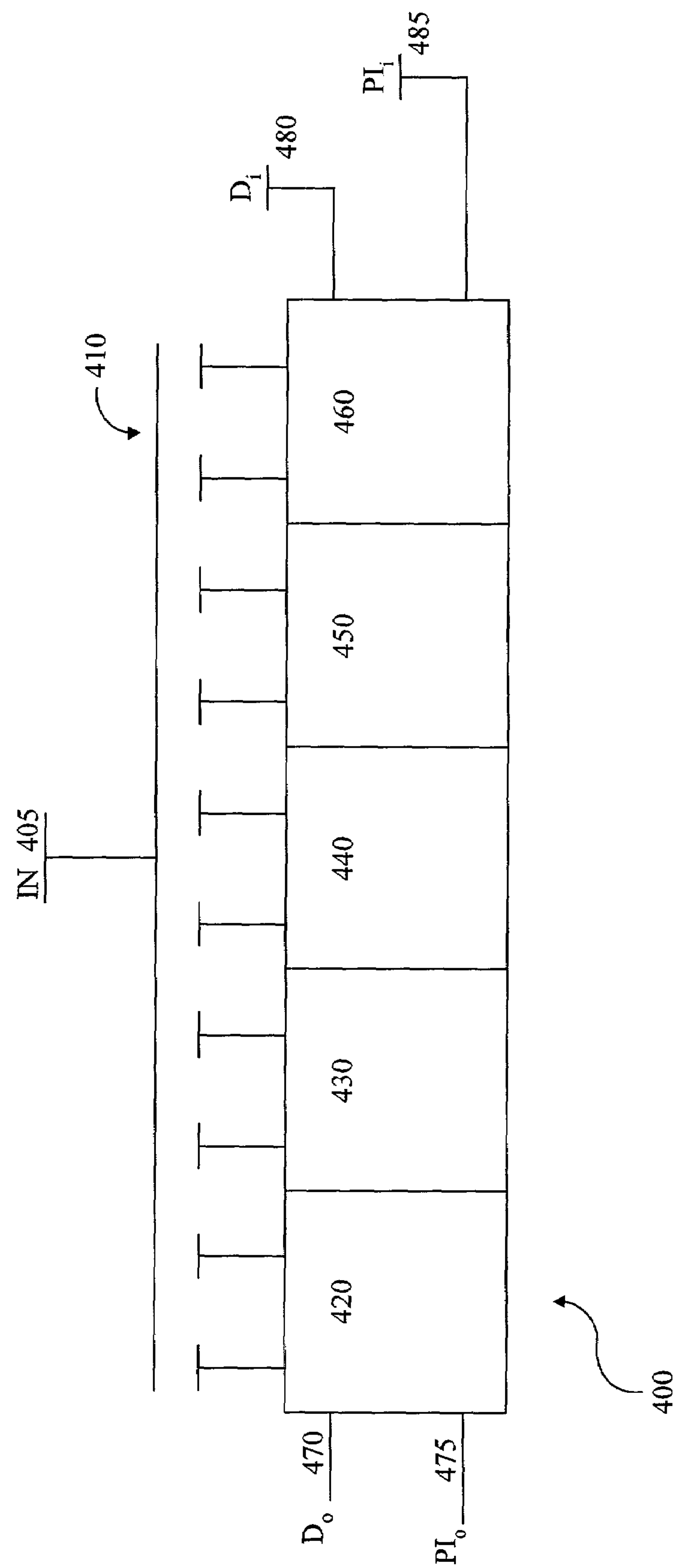
FIG. 4 illustrates an array of parity inverting cells according to the present invention.

With reference now to FIG. 4, there is illustrated therein an array of cells, each one having the logical operation of cell 300 from FIG. 3, and generally designated by the reference numeral 400. The operand 405, taken sequentially two bits at a time, is connected 410 to the top part of each of the cells, i.e., cells 420, 430, 440, 450, 460. Connection in this manner provides both an even-numbered bit and an odd-numbered bit to each cell. The cells 420, 430, 440, 450, 460 form a linear tessellation starting from the least significant bit and proceeding toward the most significant bit. The two outputs DisableOut ($D_o$) and ParityInvertOut ($PI_o$) of each cell connect directly to their respective inputs, DisableIn ($D_i$) and ParityInvertIn ($PI_i$) in the next most significant cell. The final output of the array is the ParityInvertOut 475 signal taken from the most significant cell 420.

To initialize the array 400, DisableIn 480 and ParityInvertIn 485 are set to zero.

In the array 400, the rightmost cell 460 first receives two bits 410 from the operand 405 and values for DisableIn and ParityInvertIn. If the two bits 410 from the operand 405 are both 1, then DisableIn and ParityInvertIn are passed identically to the next cell 450. In this case, DisableIn is passed as 0 and ParityInvertIn is passed unchanged, either as 1 or 0. However, if the least significant bit 410 from the operand 405 is zero, then DisableIn is passed as 1 and ParityInvertIn is 1 also. If the most significant bit 410 from the operand 405 is zero, and the least significant bit 410 from the operand 405 is one, then DisableIn is passed as 1 and ParityInvertIn is 0.

The second rightmost cell 450, and each successive cell 440, 430, 420, behave the same way. Each cell receives two bits 410 from the operand 405 and values for DisableIn and ParityInvertIn. In each cell, when DisableIn is 1, then the values of DisableIn and ParityInvertIn are passed identically to the next cell, or as output 475 for cell 420, regardless of the values of the two bits 410 from the operand 405. If DisableIn is 0, then the values of DisableOut and ParityInvertOut are determined by the values of the two bits 410 from the operand 405. If the two bits 410 from the operand 405 are both 1, then DisableIn and ParityInvertIn are passed identically to the next cell 250. In each case, DisableIn is passed as 0 and ParityInvertIn is passed unchanged, either as 1 or 0. However, if the least significant bit 410 from the operand 405 is zero, then DisableIn is passed as 1 and ParityInvertIn is 1 also. If the most significant bit 410 from the operand 405 is zero, and the least significant bit 410 from the operand 405 is one, then DisableIn is passed as 1 and ParityInvertIn is 0.

Table III shows a table of simulation results for the array. It should be apparent that for an operand with no bits of logical zero, all bits are changed and the output signal ParityInvertOut 475 is zero.

TABLE III

Simulation results for the array

| IN | $PI_i$ | $D_o$ | $PI_o$ |
|---|---|---|---|
| 1111111111 | 0 | 0 | 0 |
| 1111111110 | 0 | 1 | 0 |
| 1111111101 | 0 | 1 | 1 |
| 1111111011 | 0 | 1 | 0 |
| 1111110111 | 0 | 1 | 1 |
| 1111101111 | 0 | 1 | 0 |
| 1111011111 | 0 | 1 | 1 |
| 1110111111 | 0 | 1 | 0 |
| 1101111111 | 0 | 1 | 1 |
| 1011111111 | 0 | 1 | 0 |
| 0111111111 | 0 | 1 | 1 |

The ParityInvertOut signal 475 may be used in conjunction with the parity bit of the input operand 405 to predict the parity of the incremented value. In practice, the parity of the result would be computed and compared with the predicted value in order to validate the increment operation. The predicted value may be stored separately from the operand value or may be stored as an extra bit at the beginning or end of the operand value. If the predicted parity value is appended to the operand value, then the predicted parity bit must be removed before the operand value is evaluated in the parity check cellular array. It should be understood that the parity prediction circuit of FIG. 4 predicts a change in the parity bit of the data, but does not actually predict the parity bit of the data.

Figure 5:
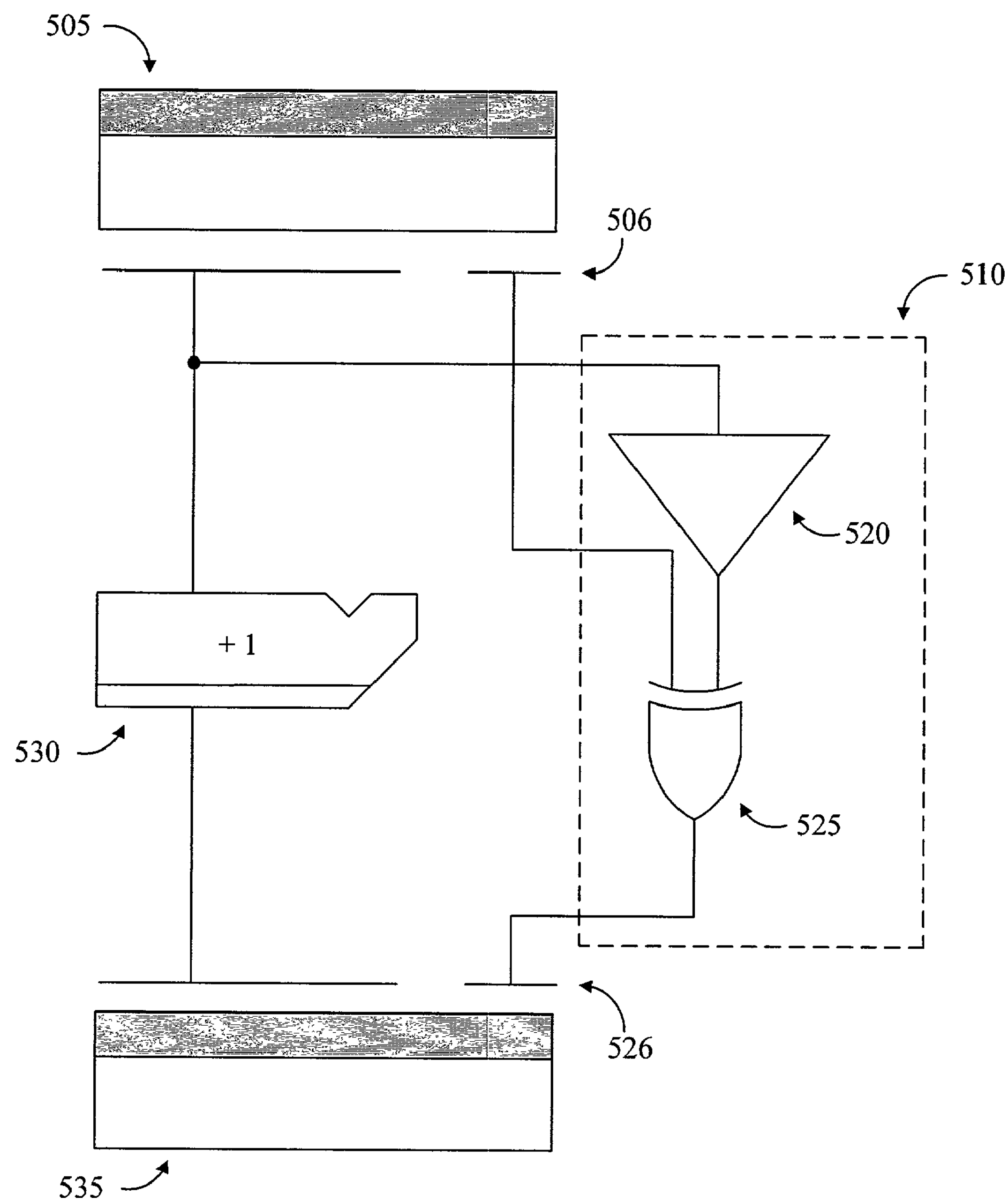
FIG. 5 illustrates a circuit using the array of FIG. 4 in parity generation.

With respect to FIG. 5, there is illustrated a parity generating circuit using the parity predicting circuit of FIG. 4. The parity generation circuit, generally designated by the reference numeral 510, includes the parity invert array 520 that is the array 400 of FIG. 4, as well as an XOR-gate 525. The operation of the parity generation circuit can be explained in relation to an increment function. In FIG. 5, input data, held in an input data register 505 including a parity bit 506, is transmitted to an incrementer 530. After the data has been incremented, the data is held in an output data register 535. The input data of the register 505 is also transmitted to the parity generation circuit 510 and is the input of the parity invert array 520. The parity bit 506 of the input data of register 505 is XORed along with the result of the parity invert array 520 to produce the new parity bit 526. The new parity bit is held in the output data register 535 as well. It should be understood that using the parity invert array 520 is more efficient and faster than recalculating and generating a new parity.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed is:

1. A circuit for generating a parity check for an increment function on an operand, said circuit comprising:

a plurality of cells arranged in a row, each cell capable of receiving from an operand input at least one pair of bits from the operand and connected sequentially to one another by way of a disable connection and a parity inversion connection; and a logic circuit in each cell that sends a disable signal over the disable connection to disable the logic circuit in each subsequent cell in the plurality of cells when there is no carry predicted from an increment to be performed on the at least one pair of bits from the operand and sends a parity inversion signal over the parity inversion connection when the at least one pair of bits from the operand indicates that incrementing the at least one pair of bits from operand would change the parity of the operand.

2. The circuit according to claim 1, wherein said disable connection further includes a disable input capable of providing a disable input signal to a cell and a disable output capable of providing a disable output signal to a subsequent cell in the plurality of cells.

3. The circuit according to claim 1, wherein no carry is predicted from an increment to be performed on a pair of bits selected from a set of bit patterns including "01 and 10".

4. The circuit according to claim 1, wherein incrementing the at least one pair of bits from the operand changes the parity when an odd number of bits are altered.

5. The circuit according to claim 4, wherein incrementing a bit pattern derived from a set of bit patterns including "00 and 10" results in altering the odd number of bits.

6. The circuit according to claim 5, wherein the logic circuit in each cell does not receive a disable signal when a carry is predicted from the one or more preceding cells in the plurality of cells.

7. The circuit according to claim 1, wherein the parity inversion signal carried over the parity inversion connection indicates that the parity of the operand will change when it is incremented.

8. An apparatus for generating a parity check for an increment function, said apparatus comprising:

means for receiving an operand in a plurality of cells before incrementing the operand by an increment function;

means for determining from one cell in the plurality of cells at least one pair of bits from the operand with at least one bit having a logical value zero that prevents a carry from occuring in one or more of the subsequent cells;

means responsive to the determination for disabling from the plurality of cells those cells subsequent to the one cell; and means for indicating an inversion of the parity when an increment to the one cell having the at least one pair of bits from the operand changes a parity of the operand.

9. The apparatus according to claim 8, wherein the parity of the operand is inverted when the increment to the at least one pair of bits from the operand would result in changing an odd number of bits.

10. The apparatus according to claim 9, wherein incrementing a bit pattern derived from a set of bit patterns including "00 and 10" results in altering an odd number of bits.

11. A method for generating a parity check for an increment function on an operand, said method comprising the steps of:

receiving an operand in a plurality of cells before incrementing the operand by the increment function;

determining from one cell in the plurality of cells at least one pair of bits from the operand with at least one bit of logical value zero that prevents a carry from occuring in one or more of the subsequent cells;

responding to the determination by disabling from the plurality of cells those cells subsequent to the one cell; and indicating an inversion of the parity when an increment to the one cell having the at least one pair of bits from the operand changes a parity of the operand.

12. The method according to claim 11, wherein the parity of the operand is inverted when the increment to the at least one pair of bits from the operand would result in changing an odd number of bits.

13. The method according to claim 12, wherein incrementing a bit pattern derived from a set of bit patterns including "00 and 10" results in altering an odd number of bits.

* * * * *